United States Patent
Tang et al.

(10) Patent No.: US 9,948,407 B2
(45) Date of Patent: Apr. 17, 2018

(54) METHOD AND APPARATUS FOR BEAMFORMING CALIBRATION IN POINT TO MULTIPOINT COMMUNICATION SYSTEMS

(71) Applicants: Taiwen Tang, Nepean (CA); Ahikam Aharony, Ottawa (CA)

(72) Inventors: Taiwen Tang, Nepean (CA); Ahikam Aharony, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/167,160

(22) Filed: May 27, 2016

(65) Prior Publication Data
US 2017/0346575 A1    Nov. 30, 2017

(51) Int. Cl.
| | | |
|---|---|---|
| H04B 17/00 | (2015.01) | |
| H04B 17/12 | (2015.01) | |
| H04B 7/06 | (2006.01) | |
| H04B 17/14 | (2015.01) | |
| H01Q 3/26 | (2006.01) | |

(52) U.S. Cl.
CPC ........... *H04B 17/12* (2015.01); *H04B 7/0617* (2013.01); *H04B 17/14* (2015.01); *H01Q 3/267* (2013.01)

(58) Field of Classification Search
CPC .......... H04B 17/12; H04B 17/14; H04B 1/04; H04B 7/0617; H01Q 3/267; H01Q 3/26; H01Q 21/061
See application file for complete search history.

(56) References Cited

U.S. PATENT DOCUMENTS 6,157,343 A * 12/2000 Andersson ............. H01Q 3/267
                                                              342/174
6,735,182 B1 * 5/2004 Nishimori ................ H01Q 3/26
                                                              342/372
(Continued)

FOREIGN PATENT DOCUMENTS

CN           1571549 A        1/2005
CN         103117781 A        5/2013
(Continued)

OTHER PUBLICATIONS

Tsai, Ming-Da, et al. "60GHz passive and active PR-path phase shifters in silicon", 2009 IEEE Radio Frequency Integrated Circuits Symposium, Boston, MA, US, Jun. 7-9, 2009, pp. 223-226.
(Continued)

*Primary Examiner* — Michelle M Koeth (57) ABSTRACT

Methods and apparatus for calibrating an antenna array are provided. A limited number of antenna elements of the array are operated to broadcast a signal. The signal carries information relevant to operation of a communication network, for receipt by other devices. By using one or a limited number of antenna elements, a radiation pattern covering a wide area is achieved. Concurrently, transmission of the broadcast signal is monitored using another one or more antenna elements of the array, operating in a receive mode. The monitored signal is used in an antenna array calibration operation. The procedure is repeated for various different transmitting and receiving antenna elements, resulting in a sequence of broadcasts using different parts of the array. The calibration results can be used to correct for operating errors such as phase shifter errors. The corrected phase shifters can then be used for beamforming during another phase of communication.

22 Claims, 6 Drawing Sheets

(56) References Cited

U.S. PATENT DOCUMENTS

| | | | |
|---|---|---|---|
| 7,362,266 B2 | 4/2008 | Collinson | |
| 8,154,452 B2* | 4/2012 | Webb | H01Q 3/267 342/174 |
| 2010/0046439 A1* | 2/2010 | Chen | H04W 48/08 370/329 |
| 2012/0021687 A1* | 1/2012 | Parker | H01Q 3/2611 455/63.1 |
| 2013/0069831 A1* | 3/2013 | Friedman | H01Q 21/065 343/702 |
| 2016/0323909 A1* | 11/2016 | Lin | H04W 72/1263 |

FOREIGN PATENT DOCUMENTS

| | | |
|---|---|---|
| CN | 104954083 A | 9/2015 |
| WO | 2009079174 A1 | 6/2009 |

OTHER PUBLICATIONS

Aumann H. M., et al. "Phased Array Antenna Calibration and Pattern Prediction Using Mutual Coupling Measurements", IEEE Transactions on Antennas and Propagation, IEEE Service Center, Piscataway, NJ, US, vol. 37, No. 7, Jul. 1, 1989, pp. 844-850.
International Search Report dated Jan. 5, 2017 for corresponding International Application No. PCT/CN2016/084404 filed Jun. 1, 2016.

* cited by examiner

METHOD AND APPARATUS FOR BEAMFORMING CALIBRATION IN POINT TO MULTIPOINT COMMUNICATION SYSTEMS

FIELD OF THE INVENTION

The present invention pertains to the field of radio antenna arrays and in particular to a method and apparatus for antenna array beamforming calibration in point to multipoint communication systems.

BACKGROUND

Phased antenna arrays are a popular means for generating a configurable antenna radiation pattern for wireless transmission or reception. A narrow beam antenna radiation pattern can be formed using an array of antenna elements in cooperation with phase shifters. The antenna elements are operated in a coherent manner so as to focus the beam in a desired direction. Beamforming and beam steering using this approach is widely known in the art. However, gain and phase mismatches among elements of the antenna array can impact performance. For example, Ming-Da Tsai and Arun Natarajan, "60 GHz Passive and Active RF-path Phase Shifters in Silicon," 2009 IEEE Radio Frequency Integrated Circuits Symposium reports a typical 3° RMS error or maximum 10° error for phase shifters operating in the 60 GHz frequency range. Phase and gain variation among phase shifters and amplifiers can be temperature dependent and/or introduced as an artifact of the manufacturing process.

One technique for calibrating phased array antennas is described in Herbert F. Aumann et al., "Phased Array Antenna Calibration and Pattern Prediction Using Mutual Coupling Measurements," IEEE Transactions on Antennas and Propagation, vol. 37, No. 7, July 1989, pp. 844-850. This reference is hereinafter referred to as Aumann. This approach utilizes the inherent mutual coupling in an array to both calibrate and predict the radiation patterns. Other techniques for far field array calibration involve the use of calibration chambers, or the use of far field sampling points as in radar applications. However, existing calibration techniques call for specialized equipment and/or a dedicated calibration process, during which the antenna is not available for communication operations.

Therefore there is a need for a method and apparatus for antenna array beamforming calibration, that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for calibrating an antenna array. Components such as phase shifters and/or amplifiers of the array can be calibrated to support beamforming operations. In accordance with embodiments of the present invention, there is provided a method for operating an antenna array. The method includes operating a limited number of antenna elements of the antenna array to transmit (e.g. broadcast) a signal carrying information corresponding to a communication operation. The communication operation may include transmitting system-critical information to one or more receivers, for example. The method further includes monitoring transmission of the signal by the limited number of antenna elements. The monitoring is performed using another set of one or more antenna elements of the antenna array. These antenna elements operate in a receive mode to obtain an indication of the signal. The method further includes performing an antenna array calibration operation based at least in part on the indication of the signal.

The calibration operation may be part of a larger overall operation. The calibration operation may include measuring a ratio of the received indication of the signal to the transmitted signal. This ratio may be a complex value indicative of a phase shift and/or amplitude difference between the transmitted and received signals. The larger operation may involve determining a calibration coefficient for correcting phase and gain errors introduced in a transmission and/or reception path of the antenna array. The determination may be based on properties of mutual couplings between pairs of antenna elements. The phase and gain errors may be relative phase and gain errors between different transmit chains and/or different receive chains of the array.

In some embodiments, the larger operation includes using multiple different antenna elements or subarrays to monitor successive (typically different) transmissions from a common transmitting antenna element or subarray, and comparing the multiple monitoring results against the known transmissions in order to determine corresponding calibration coefficients related to receive chains in the array. In other embodiments, the larger operation includes using the same antenna element or subarray to monitor different transmitting antenna elements or subarrays, and comparing the multiple monitoring results against the known transmitted data in order to determine corresponding calibration coefficients related to transmit chains in the array.

A yet-larger operation for determining calibration coefficients indicative of phase and gain errors introduced in multiple transmission and/or reception paths of the array may be performed by repeating the process for different pairs of antenna elements in the array. The results of the calibration operations can be used to correct for operating errors such as relative phase shifter errors and amplifier gain mismatch errors, or more generally phase and gain mismatches between transmit chains and receive chains, which are potentially due to the accumulation of a variety of effects. Phase shifters and/or amplifiers operating in a manner which compensates for the mismatches (based on the calibration coefficients) can then be used for beamforming during another phase of communication.

In various embodiments, a sequence of broadcasts is performed, with different broadcasts in the sequence using different antenna elements or sub-arrays. This results in successive broadcast operations being achieved by switching from one antenna element or sub-array to the next. From a far field perspective, the radiation pattern of each broadcast in the sequence is functionally similar, so that a receiver operating in the far field can readily receive each broadcast. That is, switching between transmitting antenna elements or sub-arrays does not significantly impact operation of the receiver. Using different transmitting and/or monitoring antenna elements or sub-arrays in different broadcasts enables a corresponding sequence of calibration operations to be performed. Each calibration operation in the sequence may be used for calibrating one or more antenna elements or sub-arrays. The sequence of broadcasts and calibration operations can cycle through all the different antenna elements or sub-arrays of the array, or at least all those requiring calibration. The sequence may follow a predetermined calibration order. The sequence may be repeated periodically, in the same calibration order or in a different calibration order.

In accordance with embodiments of the present invention, there is provided an apparatus for use with an antenna array. The apparatus includes a controller configured to operate a limited number of antenna elements of the antenna array to broadcast a signal carrying information corresponding to a communication operation. The apparatus further includes a local signal monitor configured to monitor transmission of the signal by the limited number of antenna elements, using another one or more antenna elements of the same antenna array. The apparatus further includes a calibrator configured to perform an antenna array calibration operation based at least in part on the indication of the signal.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

As used herein, a "network" or "communication network" may service various devices including but not necessarily limited to mobile devices. Such a network may include a radio access portion and backhaul portion. The network may further comprise various virtualized components. A primary example of such a network is a $5^{th}$ generation mobile network, for example as defined by the Next Generation Mobile Networks Alliance, which is reconfigurable and capable of operating according to network slicing, as described below.

As used herein, the term "broadcast" refers to wireless transmission of a signal using a radiation pattern having a beam divergence adequate to cover a region which potentially contains more than one receiver device. Additionally or alternatively, a broadcast may refer to transmission via radiation pattern achieved using a single antenna element of an array, or a sub-array of antenna elements operating in phase. A broadcast transmission may be used when it is desired to transmit the same signal to multiple receivers, or when the location of a receiver is not known precisely, or a combination thereof. Broadcast transmissions may be used as part of a point-to-multipoint communication system.

It is noted that, in some embodiments, broadcast communication may be used to communicate with only one receiver with a precisely known location. Although this may be relatively inefficient from a radio energy expenditure standpoint, it allows communication and calibration to be performed concurrently. As such, a broadcast may refer to a transmission potentially for receipt by a single device.

As used herein, the term "mobile device" is used to refer to one of a variety of devices which communicate with an access node via wireless communication. One skilled in the art will appreciate that a mobile device is a device designed to connect to a mobile network. This connection typically makes use of a wireless connection to an access node. Although the mobile network is designed to support mobility, it is not necessary that the mobile device itself be mobile. Some mobile devices, such as metering devices (e.g. smart meters) may not be capable of mobility, but still make use of the mobile network.

Many wireless communication systems include a broadcast phase in which one device transmits messages in a relatively wide range of directions for receipt by multiple target devices or at least one target device whose whereabouts is not precisely known. These systems may also include a point-to-point phase in which messages are transmitted in a relatively narrow range of directions. For example, Long Term Evolution (LTE) cellular wireless communication systems, $5^{th}$ Generation wireless communication systems and Wi-Fi™ communication systems call for broadcast of at least some information from an access node. Broadcast information may include control information for use in coordinating operations between devices and/or common preambles used for physical layer synchronization or other operations. In one embodiment, the wireless communication system can include a wireless backhaul having multiple nodes with point-to-point communication links therebetween, wherein the nodes also periodically or occasionally transmit and/or receive information using a broadcast mode, for example during a coordination or control phase. In some embodiments, the wireless communication occurs in a frequency band centered at about 60 GHz.

In some embodiments, an antenna array is used for broadcast communication during certain time slots or time intervals, whereas at other times it may be used for reception and/or point-to-point communication. During point-to-point communication the antenna array may employ beamforming using coherent operation of multiple antenna elements operating in a particular phased relationship, as would be readily understood by a worker skilled in the art. For example, during a first time interval the antenna array may be used in a broadcast mode using a limited number of antenna elements, with calibration performed concurrently. During a second time interval, the antenna array may be used in a point-to-point or beamforming mode. Adequate beamforming performance often requires calibration of antenna array components, such as phase shifters and power amplifiers, in order to generate an appropriate mix of phase-offset signals which are necessary for generating a desired radiation pattern.

It is recognized herein that one technique for generating a wide beam radiation pattern in a phased antenna array is to transmit from only one, or a limited number, of the antenna elements. Other elements of the array can be inhibited from transmitting, for example by operating a switch, reducing gain of a power amplifier, or operating the element in a receive-only mode. In this way, the phased antenna array can be used for broadcast communication. It is further recognized herein that online antenna array calibration techniques, such as those described in Aumann, call for only one, or a limited number, of the antenna elements to transmit at a time, while also monitoring the transmitted signal using another one, or limited number of the antenna elements. Therefore, embodiments of the present invention involve performing antenna array calibration operations concurrently with broadcast communication.

Embodiments of the present invention provide for an antenna array calibration method and associated apparatus, in which a signal transmitted by one or a limited number of antenna elements is concurrently used both as part of a calibration procedure and as part of a broadcast communication. Such an arrangement can be useful in that the signal satisfies both the requirements of known online calibration techniques and the requirements for a wide beamwidth signal appropriate for point to multipoint transmission. This may mitigate or eliminate the need to set aside dedicated time intervals during which calibration operations are performed and other communication operations are suspended. As such, communication delays and/or variations in communication delays can be mitigated.

Embodiments of the present invention provide for array self-calibration, in which array mutual coupling is used for calibrating the antenna array without use of external test sources. The antenna elements of the array may be uniformly spaced and may have substantially identical, symmetric radiation patterns.

Figure 1A:
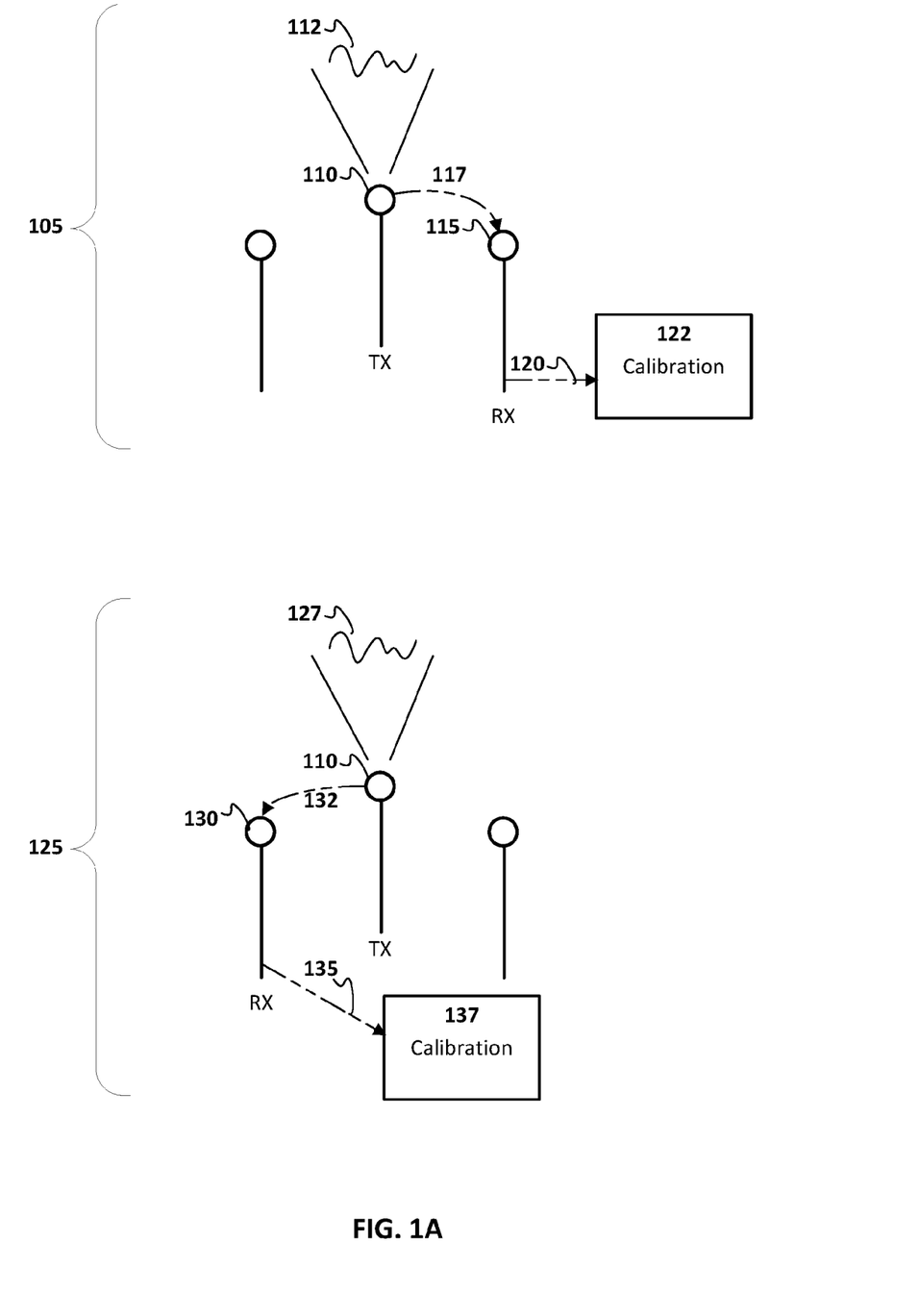
FIG. 1A illustrates a sequence of operations according to an embodiment of the present invention.

FIG. 1A illustrates a sequence of operations for calibrating a receive chain according to an embodiment of the present invention. The receive chain corresponds to the radio frequency path from an antenna element to an analog-to-digital converter (ADC), for example. In a first part 105 of the sequence, an antenna element 110 (or a sub-array) of an antenna array is operated to transmit a signal 112. The transmission may be a broadcast transmission and carries information corresponding to a communication operation. The transmission is monitored 117 by another antenna element 115 (or another sub-array) of the antenna array. The received signal obtained via monitoring 117 is provided 120 for processing according to an antenna array calibration operation 122. In a second part 125 of the sequence, the antenna element 110 transmits another signal 127, a further antenna element 130 (or a further sub-array) monitors 132 the transmission, and the received signal obtained via monitoring 132 is provided 135 for processing according to another antenna array calibration operation 137. An indication of the transmitted signals 112, 127 as obtained directly from the transmitting side, may also be provided for processing according to the antenna array calibration operations 122, 137. In one embodiment, the transmitted signals 112 and 127 are a same signal, so that the monitoring 117 and 132 may be performed concurrently. Concurrent monitoring may be appropriate for example when a first receive chain corresponding to the antenna element 115 includes a first ADC and a second, different receive chain corresponding to the antenna element 130 includes a second, different ADC.

Figure 1B:
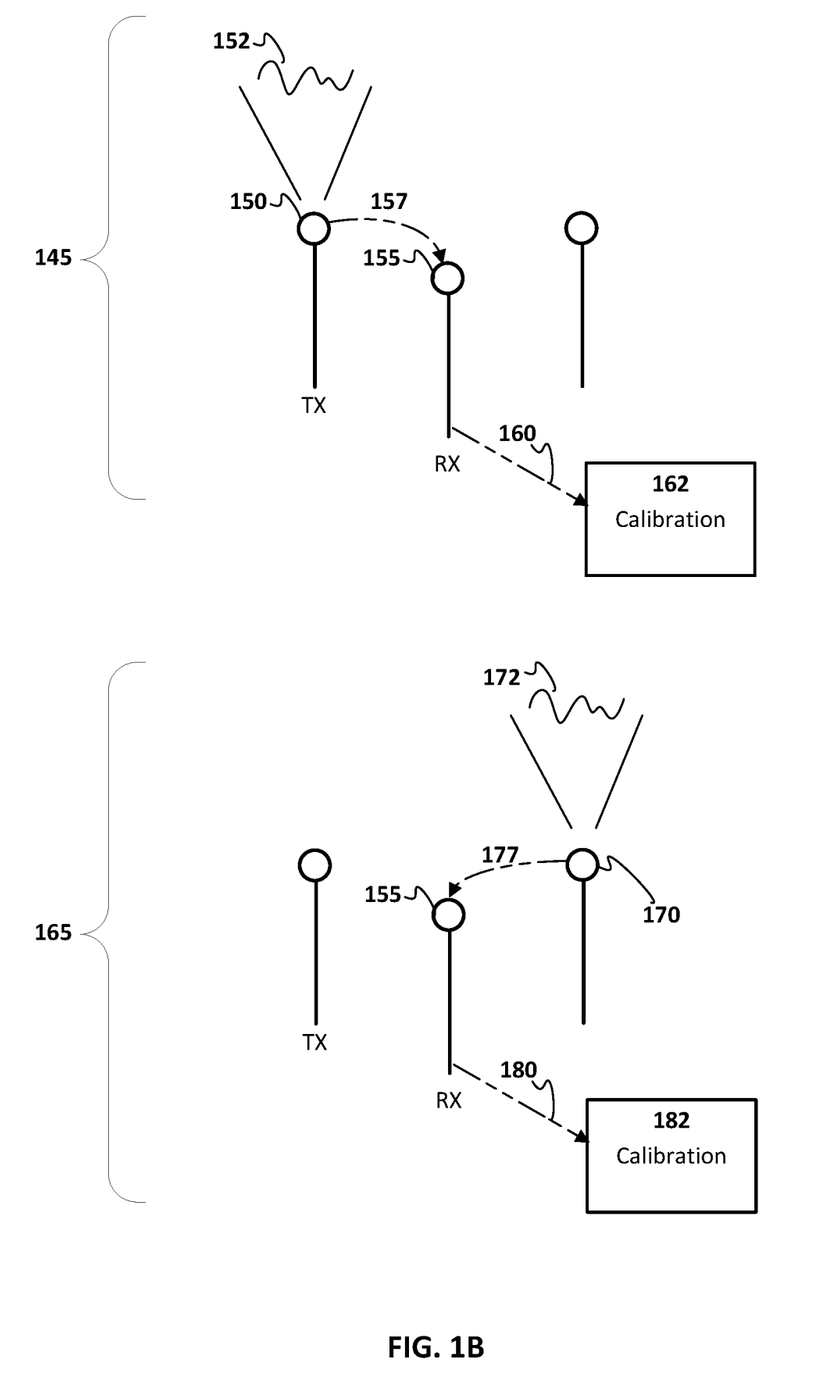
FIG. 1B illustrates a sequence of operations according to another embodiment of the present invention.

FIG. 1B illustrates a sequence of operations for calibrating a transmit chain according to an embodiment of the present invention. The transmit chain corresponds to the radio frequency path from digital-to-analog converter (DAC) to an antenna element, for example. In a first part 145 of the sequence, an antenna element 150 (or a sub-array) is operated to transmit a signal 152, such as a broadcast signal. The transmission is monitored 157 by another antenna element 155 (or another sub-array) of the antenna array. The received signal obtained via monitoring 157 is provided 160 for processing according to an antenna array calibration operation 162. In a second part 165 of the sequence, a further antenna element 170 transmits another signal 172, and the same receiving antenna element 155 monitors 177 the transmission. The received signal obtained via monitoring 177 is provided 180 for processing according to another antenna array calibration operation 182. An indication of the transmitted signals 152, 172 as obtained directly from the transmitting side, may also be provided for processing according to the antenna array calibration operations 162, 182.

For both FIGS. 1A and 1B, the results from the two antenna array calibration operations may be combined (possibly along with results from further calibration operations) to provide information such as calibration coefficients (also referred to as correction factors) for correcting phase and/or gain errors of the antenna array as it pertains to one or more transmit or receive chains of the array. Typically, multiple calibration operations are used in determining a calibration coefficient. For FIG. 1A, the calibration coefficients may pertain to a receive chain coupled to antenna element 130 (or 115). For FIG. 1B, the calibration coefficient may pertain to a transmit chain coupled to antenna element 170 (or 150). The calibration coefficients may be used to correct relative gain and phase errors for such receive and transmit chains. It may only be necessary to correct relative errors, i.e. mismatches, between different chains, rather than correcting absolute errors.

The two transmitted signals (112 and 127, or 152 and 172) may be different signals, different portions of the same signal, or multiple copies of the same signal. The two signals may be transmitted consecutively or at different times separated by an interval. The sequence of operations may continue with different receiving antenna elements and/or different transmitting antenna elements.

Figure 2:
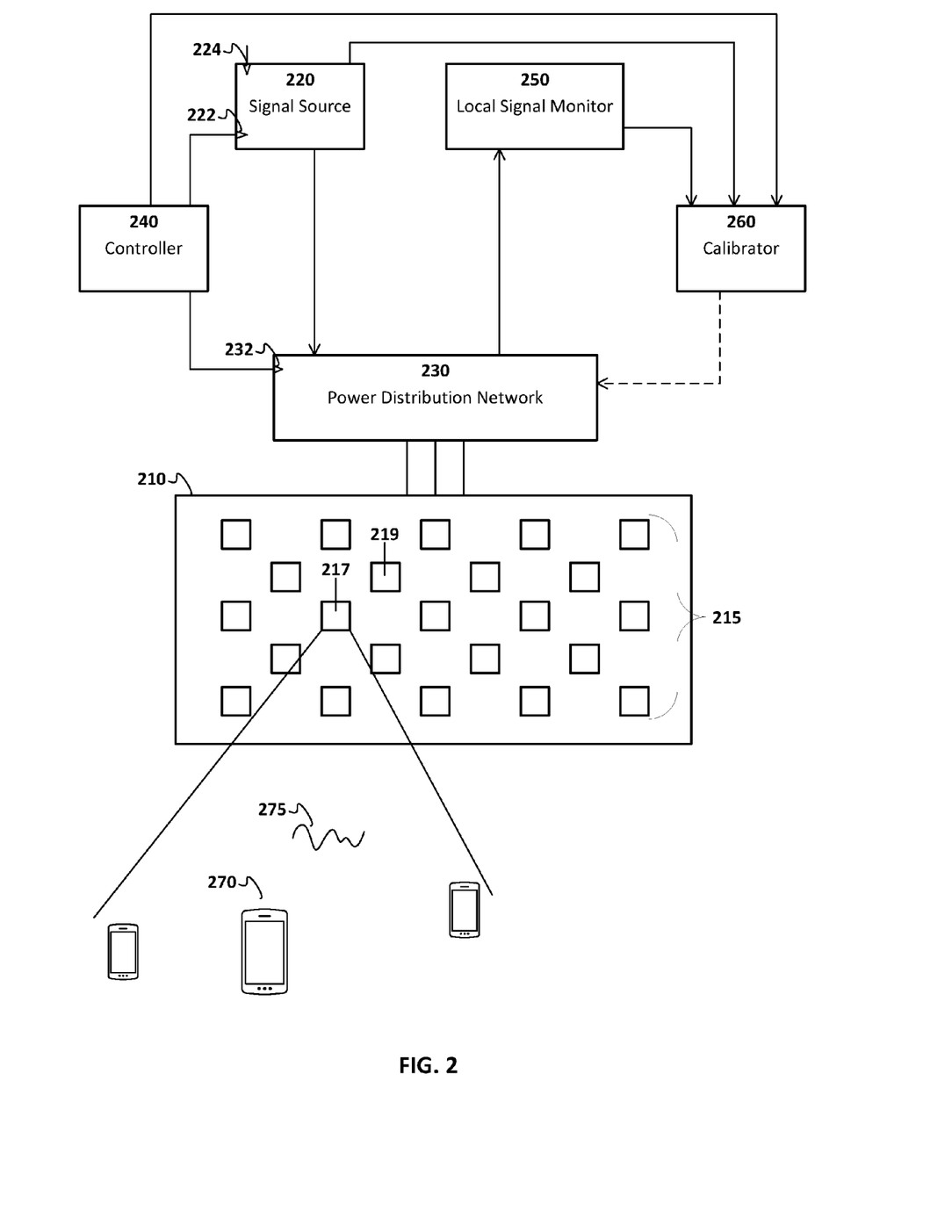
FIG. 2 illustrates an apparatus provided in accordance with an embodiment of the present invention.

FIG. 2 illustrates operation of an antenna array 210 in accordance with an embodiment of the present invention. It should be noted that the embodiment of FIG. 2 is provided by way of example, and its operational details can be varied in several ways. The antenna array 210 is operatively coupled to a signal source 220 via a power distribution network 230. The signal source generates a signal for transmission, and the power distribution network routes the signal to one or more selected antenna elements 215 of the antenna array. The signal source 220 and the power distribution network 230 include control input ports 222, 232 for controlling operation thereof.

The power distribution network 230 includes transmission lines as well as controllable elements for providing signals from the signal source to a selectable one or more of the antenna elements. The controllable elements may include switches and/or amplifiers, such as power amplifiers. The controllable elements may also include phase shifters. The controllable elements are presented as part of the power distribution network for clarity, however it will be readily understood that they may be alternatively considered as being separate from the power distribution network. At least the phase shifters are controllable to implement beamforming operations in a beamforming mode of operation, which is different from the broadcast and calibration mode. The power distribution network may accordingly be operated at different times in either the beamforming mode or the broadcast and calibration mode. In various embodiments, by operation of the control input ports, the power distribution network can route the signal from the signal source to one or more selectable antenna elements of the array, while inhibiting the signal from being transmitted by other antenna elements of the array. In the illustrated embodiment, and by way of example, the power distribution network is operated to route the signal from the signal source to one particular antenna element 217 of the antenna array, while inhibiting the signal from being transmitted by all antenna elements 215 other than the particular antenna element 217.

In more detail, the power distribution network 230 is configured to receive control signals via the control input port 232 for disposing the switches, amplifiers and/or phase shifters in a desired condition, for example to open or close switches, adjust amplifier gains, and adjust phase shifts. The control signals may also be operable to connect a selected antenna element to a transmit path or a receive path.

In various embodiments, the controllable elements include DC switches which are configured to switchably apply or remove a DC bias or a power supply source for an RF chain connected to an antenna element or sub-array. In this way, propagation of RF signals along selected branches of the power distribution network can be inhibited. Using such DC bias switches rather than an RF switching network may reduce the potential for insertion loss due to the presence of RF switches. However, it is contemplated that RF switches may also be used as controllable elements for allowing and inhibiting RF signal propagation, provided that the resulting insertion loss is tolerable.

In various embodiments, the power distribution network includes a transmission portion for providing signals to the antenna elements, and a reception portion for providing signals received by the antenna elements. The transmission and reception portions may be partially or wholly separate, and are configured so that transmission and reception can occur simultaneously. For example, the transmission portion may include a first branched transmission line structure coupling the signal source to the antenna elements, and the reception portion may include a second, separate branched transmission line structure coupling the antenna elements to a receiver. In various embodiments, the transmission portion and the reception portion include separate amplifiers and/or phase shifters.

A controller 240 is operatively coupled to the control input ports. During a given time interval corresponding to the broadcast and calibration mode, the controller 240 causes a limited number of antenna elements of the antenna array 210 to broadcast a signal 275. In FIG. 2, the limited number of antenna elements is represented as a single antenna element 217. The signal 275 carries information corresponding to a communication operation. The signal 275 is transmitted for reception by at least one remote receiver 270, such as but not limited to a mobile device. In addition to being used for calibration as will be described below, the transmitted signal 275 is therefore used to transmit information to the remote receiver 270, such as system information, broadcast data, synchronization information, or the like. The controller 240 may be further configured to inhibit transmissions by antenna elements of the antenna array 210 other than the limited number of antenna elements during transmission of the signal 275. In this way, the signal 275 is transmitted by the limited number of antenna elements only. The operation of antenna elements, as well as the inhibition of transmission by other antenna elements, may be performed by way of control signals which are generated and provided to the control input ports 222, 232 of the signal source 220 and the power distribution network 230. For example, the control signals may set amplifier gains to zero to inhibit transmission.

The operated limited number of antenna elements can include a single antenna element, such as antenna element 217. Alternatively, the limited number of antenna elements can include multiple ones of the antenna elements 215, for example proximate to one another in the array and/or corresponding to an antenna sub-array. Antenna elements of a sub-array may belong to a common branch of the power distribution network 230. Alternatively, antenna elements of a sub-array may belong to different branches of the power distribution network 230. In some embodiments, when multiple antenna elements are operated, they are operated in phase.

The signal source 220 further includes an information input port 224 which is configured to receive information to be included in a broadcast transmission. During other phases of operation, the information input port 224 may receive other information to be included in other transmissions. The information may be provided by an external source such as a communication port of an access node incorporating the signal source 220. The information corresponds to a communication operation, such as a broadcast communication operation. As noted above, examples of information include control information for use in coordinating operations between devices and/or common preambles used for physical layer synchronization or other operations. Alternatively, the information input port 224 may be omitted and the information for inclusion in the broadcast signal can be generated internally by the signal source 220, for example by retrieval from memory. Information provided to the information input port 224 may vary between broadcast communication operations.

The control input port 222 is operable to controllably dispose the signal source 220 to operate in the broadcast and calibration mode, during which the signal source 220 receives information corresponding to a particular communication operation, such as information which is to be broadcast, generates a radiofrequency signal incorporating this information, and provides the radiofrequency signal to the power distribution network 230.

The signal source 220 may include various digital, baseband and radiofrequency components configured for generating a modulated radiofrequency signal for provision to an antenna, as would be readily understood by a worker skilled in the art. For clarity, a detailed description of this component is omitted. Examples of signal source components include mapping units for converting digital input data to constellation symbols, digital-to-analog converters, mixers, radiofrequency oscillators, and filters.

FIG. 2 further illustrates a local signal monitor 250 operatively coupled to the antenna array 210 via the power distribution network 240 (such as a reception portion thereof). The local signal monitor 250 is configured to monitor transmission of the signal 275 by the limited number of antenna elements using another one or more antenna elements of the antenna array 210 operating in a receive mode to obtain an indication of the signal. The receiving antenna elements are different from the transmitting antenna elements. FIG. 2 illustrates a single antenna element 219 which is proximate to the transmitting antenna element 217 and disposed to monitor the transmitted signal 275. However, in various embodiments, multiple antenna elements, such as a sub-array may be used to monitor the signal 275.

Separate transmission line portions of the power distribution network 230 may be provided for transmission and reception operations. This mitigates interference between transmitted signals and received signals.

The power distribution network 230 is configured to couple the receiving antenna element 219 to the local signal monitor 250. The coupling may be via a transmission line path which is substantially isolated from the transmission line path from the signal source 220 to the transmitting antenna element 217. The coupling may include a receive path of power distribution network 230, coupled to controllably connect the receiving antenna element to the local signal monitor 250. The receive path may include a receiving amplifier such as a low noise amplifier. This configuration may be in response to control signals received from the controller 240 (or alternatively from the local signal monitor) at control input port 232. In some embodiments, the local signal monitor 250 may be responsive to control signals from the controller 240, for example to dispose the local signal monitor 250 into a monitoring mode during the broadcast and calibration phase.

In some embodiments, the local signal monitor 250 may include signal reception circuitry configured to filter, demodulate and/or convert the signal to another form. As with the signal source 220, the signal reception circuitry may include filters, radiofrequency oscillators, mixers, analog-to-digital converters, signal constellation mapping units, digital signal processors, and the like. Alternatively the signal reception circuitry may be located between the power distribution network 230 and the local signal monitor 250.

FIG. 2 further illustrates a calibrator 260 configured to perform an antenna array calibration operation based on the indication of the received signal, as provided by the local signal monitor 250. In some embodiments, the calibrator 260 and local signal monitor 250 may be integrated. The local signal monitor 250 provides the indication of the signal to the calibrator 260. The indication of the signal is generated by the receiving antenna element 219 due for example to near-field electromagnetic coupling of the receiving and transmitting antenna elements. As such, the received radiofrequency energy has a significant component corresponding to the transmitted signal 275 due to mutual coupling. The indication of the signal, as provided by the local signal monitor 250, may be further processed, for example by amplification, filtering, analog-to-digital conversion, etc.

The signal source 220 may further transmit an indication of the signal being transmitted to the calibrator 260. The transmitted indication may be a digital or analog representation of the signal as generated by the signal source 220. In one embodiment, the transmitted indication is a copy of the signal as generated by the signal source 220. The indication of the signal may correspond to a set of modulation symbols, or digital information carried by the signal, for example. In some embodiments, the indication of the signal being transmitted may be obtained from the power distribution network 230, for example using the local signal monitor 250 to monitor the transmit path of the power distribution network 230.

The calibrator 260 may further be responsive to control signals from the controller 240, for example to trigger the calibrator 260 to perform a calibration operation during a broadcast and calibration phase. The controller 240 may further provide information such as which antenna elements of the antenna array 210 are currently being used for transmission and reception as part of the calibration operation. The calibrator 260 may include components such as a microprocessor operatively coupled to memory, along with appropriate input circuitry such as a communication circuit and/or signal detection circuit.

The calibrator 260 performs a set of calibration operations which provide one or more calibration coefficients for use in compensating for relative gain and/or phase errors inherent to a particular portion of an antenna array. A plurality of calibration coefficients for some or all portions of the array may be provided based on multiple sets of calibration operations. The calibrator 260 may be configured to determine calibration coefficients according to the procedure described in Aumann, or a similar procedure. The phase errors may arise from operating mismatches between different phase shifters in the power distribution network 230. The calibrator 260 may provide information to the controller 240 or another operating circuit associated with the antenna array 210 and responsible at least for compensating operation of the antenna array using calibration coefficients which are generated based on the set of calibration operations.

In various embodiments, each calibration operation includes comparing the signal indication provided by the signal source 220 and the signal indication provided by the local signal monitor 250. The comparison may include determining a gain difference and/or phase shift between the two signals. The determined phase shift in turn is used in a subsequent determination of calibration coefficients.

The calibration coefficients may be provided directly to the power distribution network, or alternatively to the controller 240. As such, embodiments of the present invention further comprise adjusting operation of one or more phase shifters of the array based on the calibration coefficients.

Calibration operations according to some embodiments are described in more detail as follows. Beamforming antenna arrays have significantly worse radiation patterns when the analog gain and phase errors of each beamforming path of each radiation element are not properly calibrated. Aumann proposed a method of using mutual coupling effects of antenna elements to calibrate these gain and phase errors and determine associated calibration coefficients for use in beamforming operations. The basic form of this technique assumes a two dimensional antenna array with equal distances between each element and its nearest neighbors.

In various embodiments, and according to the method used in Aumann, the transmission gain and phase error, and the reception gain and phase error are assumed to be the same for each radiofrequency path connected to each antenna element (such as antenna patches) of the array. The measured transfer function $C'_{n,m}$ between the mth transmitting antenna element and the nth receiving antenna element based on digital signal processing can be represented as:

$$C'_{n,m} = w_n u_n C_{n,m} w_m u_m,$$

where $C_{n,m}$ is the actual mutual coupling between mth transmit antenna element and the nth receive antenna element, $w_n$ is the beamforming weight for the nth antenna element, and $u_n$ is the complex gain and phase error for the nth RF path connected to the nth antenna patch. Without loss of generality, the beamforming weights $w_n$ and $w_m$ can be set to one based on Aumann. However, it should be understood that other methods of setting the beamforming weights can be employed.

An assumption about the symmetrical topology of antenna patches may be imposed such that $C_{n,m}=C_{n,m+1}$ is also assumed. Thus, in various embodiments, the following relationship can be assumed to hold, at least approximately:

$$\frac{C'_{n,m}}{C'_{n,m+1}} = \frac{u_m}{u_{m+1}} = \frac{u_m}{u_{m+2}} \frac{u_{m+2}}{u_{m+1}} = \frac{u_m}{u_{m+2}} \frac{C'_{n+1,m+2}}{C'_{n+1,m+1}}.$$

Define $$W_{m+1} = \frac{C'_{n,m}}{C'_{n,m+1}}.$$

This yields $$\frac{u_m}{u_{m+2}} = W_{m+1} W_{m+2}.$$

It follows that:

$$u_{m+2} = u_1 / \Pi_{i=2}^{m+2} w_i.$$

The values of $1/\Pi_{i=2}^{m+2} w_i$ may be determined from the calibration operations and used as calibration coefficients for the phase and gain error of the (m+2)th element.

By using a common transmitter and a sequence of different receivers, gain and phase mismatches between different receive chains in the sequence can be determined and compensated for. For example, one of the receive chains can be used as a reference, and calibration coefficients for causing the next receive chain to match the reference can be determined. Similarly, by using a common receiver and a sequence of different transmitters, gain and phase mismatches between different transmit chains in the sequence can be determined and compensated for.

In various embodiments, the calibration coefficients may be applied to adjust variable phase shifters and variable gain amplifiers for transmit chains or receive chains. Typically, variable phase shifters and variable gain amplifiers have finite bit precision, e.g., 2 bits to 6 bits. The adjustments due to calibration are therefore quantized to the nearest achievable phase or gain value. In this case, calibration does no better than the quantization error due to the finite number of bits. Relative differences between nominal values of the phase shifters and gain amplifiers and the actual values of phase shifters and the gain amplifiers can be determined in the calibration process.

Figure 3A:
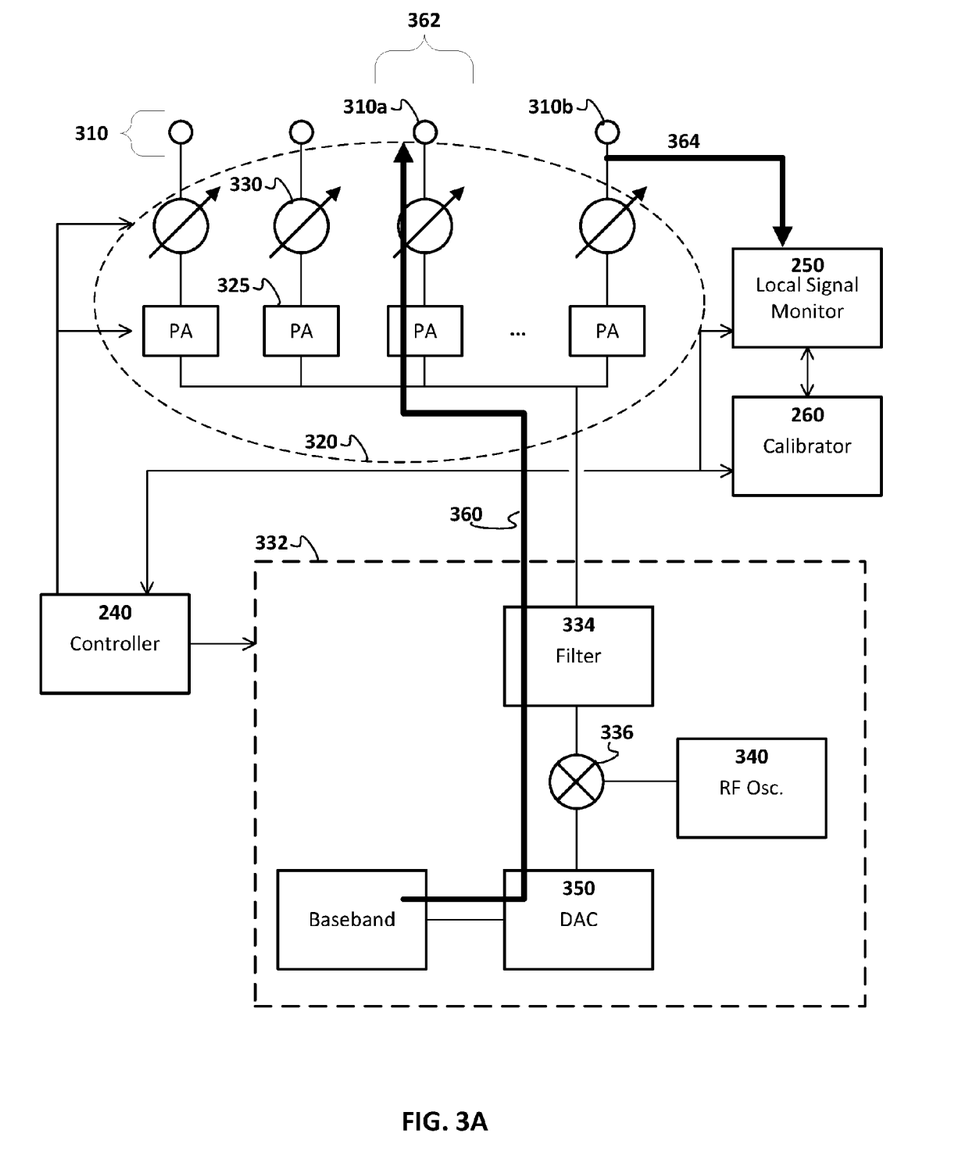
FIGS. 3A and 3B illustrate an apparatus and operation thereof, in accordance with embodiments of the present invention.
Figure 3B:
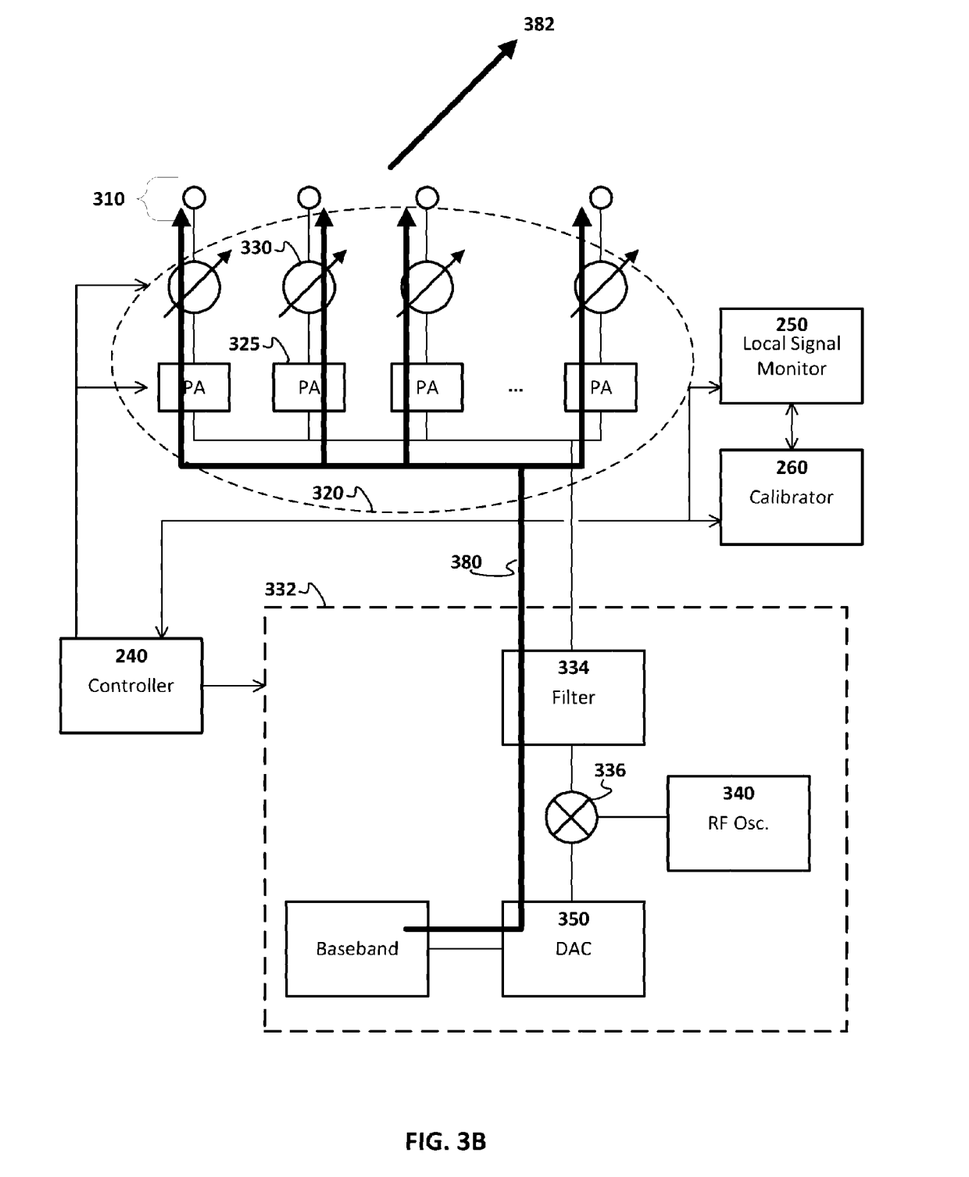

The above scenario is applicable for example when all receive chains are coupled to a single ADC and/or when all transmit chains are coupled to a single DAC, for example as illustrated in FIGS. 3A and 3B. Digital correction to compensate for the above-identified relative differences between nominal and actual values can be performed on the digital side of an ADC or DAC at the endpoint of the relevant transmit or receive chain. When multiple ADC or DAC modules are present, application of the calibration coefficients can be modified accordingly.

As an example, a phase shifter may have a nominal value of 0 degrees, while and its actual value is 20 degrees. The nominal values may be [0 90 180 270] for a 2 bit phase shifter, but the corresponding actual values may be [20 100 170 290]. The relative phase shift errors can be accordingly determined via the calibration process as [0 −10 −30 0]. This is done by using the first value (20 degrees) as a reference point. After their determination, the relative differences can be accounted for when applying the calibration coefficients to phase shifters and gain amplifiers, for example when all receive chains are coupled to a single ADC and/or when all transmit chains are coupled to a single DAC.

FIGS. 3A and 3B schematically illustrate an apparatus provided in accordance with an embodiment of the present invention. The apparatus includes an antenna array having a plurality of antenna elements 310, the antenna elements 310 operatively coupled to a power distribution network 320 comprising plural branches. Each branch of the power distribution network 320 may terminate at one of the antenna elements 310. Alternatively at least one branch of the power distribution network 320 may terminate at a sub-array comprising multiple antenna elements 310, in which case the at least one branch may include sub-branches. The power distribution network 320 incorporates controllable power amplifiers 325 and phase shifters 330, for example with one power amplifier 325 and phase shifter 330 per branch of the transmitter portion of the power distribution network 320. In some embodiments, the power amplifier 325 is operable in either a transmit configuration or a receive configuration. In the transmit configuration, an incoming signal may be amplified and passed toward the associated phase shifter 330. In the receive configuration, an incoming signal from the phase shifter may be amplified and passed toward signal reception circuitry. In various embodiments, a first power distribution network or part thereof is provided for transmission, and a second, separate power distribution network or part thereof is provided for reception. One or more branches of the power distribution network 320 may be inhibited from passing a signal toward the phase shifters 330, for example by setting the corresponding amplifier 325 gain to zero, or operation of a switch influencing propagation of an RF signal through the power distribution network 320, or the like.

FIGS. 3A and 3B further illustrate components of a signal source 332, including a filter 334, mixer 336, RF oscillator 340, and a digital-to-analog converter 350. At least the filter can be alternatively considered to be part of the power distribution network 320. The power amplifiers 325, phase shifters 330, and signal source 332 may be responsive to control signals from a controller 240.

In the configuration of FIG. 3A, the apparatus is disposed in a broadcast and calibration mode. A signal 360 is generated and passed through one of the branches 362 of the power distribution network 320 to be transmitted by a corresponding one of the antenna elements 310a. A further antenna element 310b is coupled to a local signal monitor 250, via a calibration feedback port or branch of a reception portion of the power distribution network 320. A monitored signal 364 is provided from the further antenna element to the local signal monitor 250. The monitored signal includes a component that arises due to the coupling between the transmitting and receiving antennas. The reception portion of the power distribution network may include a separate branched transmission line structure (not shown). The local signal monitor 250 may include receiver electronics. The local signal monitor further provides information to a calibrator 260. The local signal monitor 250 and calibrator 260 are also operatively coupled to the controller 240.

In the configuration of FIG. 3B, the apparatus is disposed in a beamforming mode. A signal 380 is generated and passed through multiple branches of the power distribution network 320 to be transmitted by multiple corresponding antenna elements 310. The phase shifters 330 are configured to apply different phases at different branches so as to cause a radiation pattern which is directed at a configurable direction of departure 382. The power amplifiers 325 may also be configured differently in order to provide the desired radiation pattern. The antenna elements 310 are coherently driven in order to provide for a focused and steerable antenna beam.

In various embodiments, as mentioned above, a series of calibration operations is performed. Each calibration operation of the series involves a different set of transmitting and receiving antenna elements. Different sets of transmitting and receiving antenna elements can be selected in different calibration operations, so as to determine calibration coefficients for correcting errors present between different sets of antenna elements. For example, each antenna element may be selected as a transmitting antenna element for a given batch of calibration operations. For each operation in the batch, a different antenna element may be selected as a receiving antenna element. The batch includes at least two receiving antenna elements which are substantially equidistant from the transmitting antenna element. Batches of operations need not be performed sequentially, but rather operations from different batches may be interleaved.

As another example, each antenna element may be selected as a receiving antenna element for a given batch of calibration operations. For each operation in the batch, a different antenna may be selected as a transmitting antenna element. The batch includes at least two transmitting antenna elements which are substantially equidistant from the receiving antenna element.

As such, embodiments of the present invention include defining, for example by the controller, a plurality of different antenna element combinations. Each combination indicates a set of one or more transmitting antenna elements and a set of one or more receiving antenna elements, the receiving antenna elements being different than the transmitting antenna elements.

In some embodiments, where there are n antenna elements in the array, the batch includes up to, but typically less than, n−1 operations, each operation involving the same transmitting antenna but a different receiving antenna, or alternatively each operation involving the same receiving antenna but a different transmitting antenna. For example, only antenna elements which are physically close to the transmitting antenna element may be used as receiving antenna elements, and vice-versa.

Figure 4:
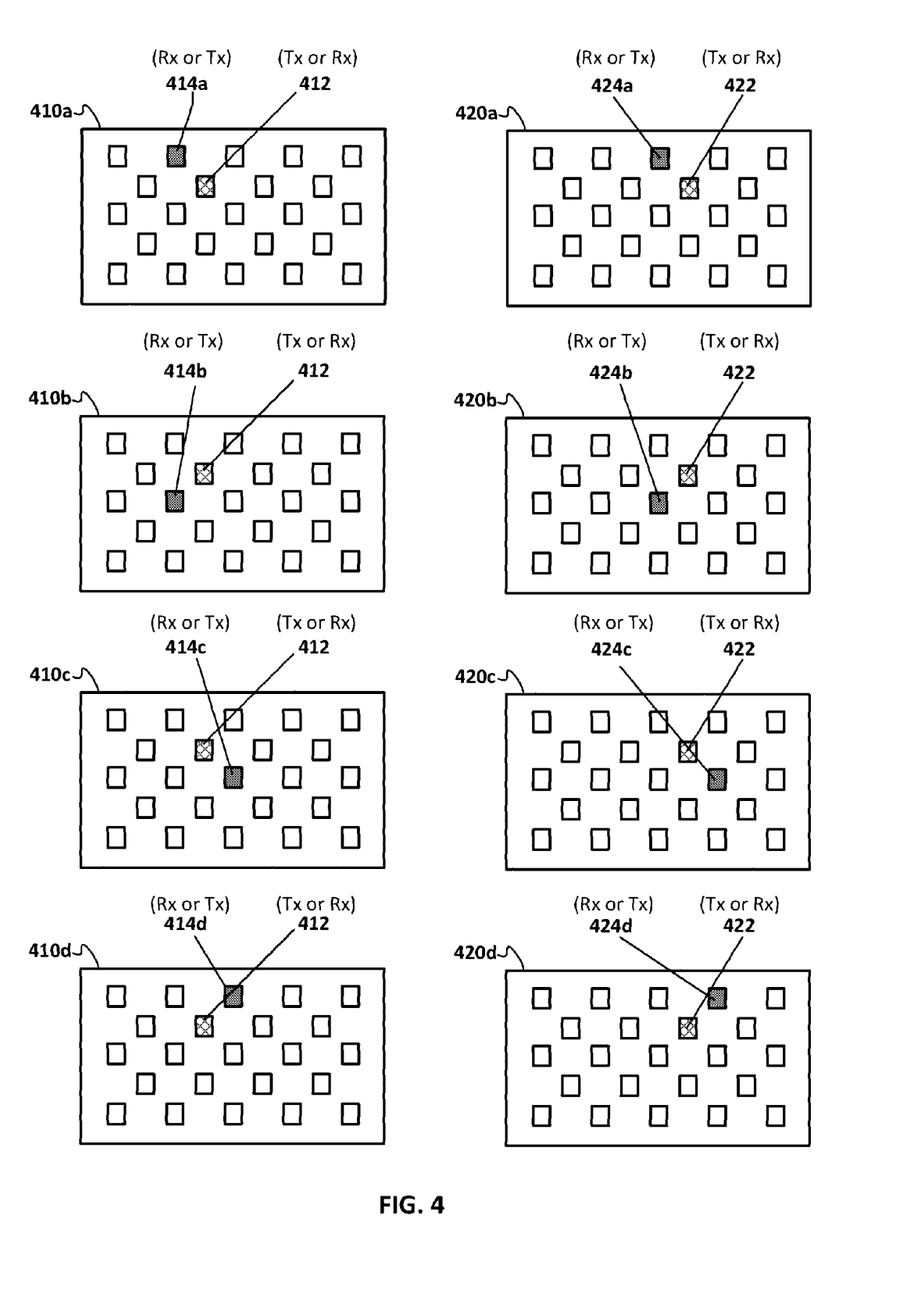
FIG. 4 illustrates operation of an apparatus in accordance with an embodiment of the present invention.

FIG. 4 illustrates active transmitting and receiving antenna elements according to sequence of calibration operations, in accordance with an embodiment of the present invention. In a first batch of antenna configurations 410a to 410d, a first antenna element 412 is used as the transmitting antenna element and different other antenna elements 414a to 414d are used as the receiving antenna elements, respectively. Alternatively, the first antenna element 412 can be used as the receiving element and the different other elements 414a to 414d can be used as the transmitting antenna elements. In a second batch of antenna configurations 420a to 420d, a second antenna element 422 is used as the transmitting antenna element and different other antenna elements 424a to 424d are used as the receiving antenna elements, respectively. Again alternatively, the first antenna element 422 can be used as the receiving element and the different other elements 424a to 424d can be used as the transmitting antenna elements. Further batches of antenna configurations may also be included. Likewise, each batch may include further antenna configurations in which yet different antenna elements are used as the receiving (or transmitting) antenna elements, but with the transmitting (or receiving) antenna element held fixed for each batch.

Similarly, in some embodiments, sets of multiple antenna elements, such as sub-arrays may be defined, and each calibration operation in the series may involve different ones of the defined sets of multiple antenna elements for transmission and/or monitoring. For example, in FIG. 4, each active transmitting and receiving antenna element 412, 414a to 414d, 422, 424a to 424d may represent a defined sub-array of antenna elements. The elements of the sub-array may be relatively close to each other, for example adjacent to each other or in a localized grouping. The elements of the sub-array may be operated in phase. The set of configurations 410a to 410d and 420a to 420d in FIG. 4 can be adopted in a substantially arbitrary order, possibly interleaved with other configurations.

In more detail, for each of the sequence of calibration operations corresponding to an antenna element combination, the transmitting antenna elements are operated to transmit (e.g. broadcast) one of a plurality of signals carrying information corresponding to a communication operation. The transmission of said one of the plurality of signals by the transmitting antenna elements is concurrently monitored using the receiving antenna elements operating in the receive mode to obtain an indication of said one of the plurality of signals. A corresponding one of a sequence of antenna array calibration operations is then performed based on the indication of said one of the plurality of signals. Each of the sequence of calibration operations may be performed as described with respect to FIG. 2.

It is noted that, rather than transmitting a narrowband pilot tone by antenna elements, the antenna elements of the array are operated, during the broadcast and calibration mode, to transmit a signal carrying information. As such, the signal necessarily has a nonzero bandwidth. In various embodiments, the transmitted signal has a limited bandwidth.

In various embodiments, knowledge of the signal as it is transmitted is used in the calibration procedure. For example, the modulation characteristics of the signal, the signal bandwidth, or the like, may be used in calibration. In various embodiments, the monitored signal is compared to the transmitted signal, as described above.

In various embodiments, the broadcast and calibration procedure is used to determine calibration coefficients (such as phase shifter error parameters) for a given and limited frequency band, centered on the carrier frequency of the signal being broadcast. It is noted that these calibration coefficients may be frequency dependent. Therefore, if calibration coefficients are desired for a wider range of frequencies, the procedure can be repeated using broadcast signals having different carrier frequencies. This results in a profile of calibration coefficients, such as phase errors, as a function of frequency.

In various embodiments, OFDM (orthogonal frequency division multiplexing) type broadcast preambles are transmitted and the signals carrying the broadcast preambles are concurrently used for antenna array calibration. In this case, the transfer function $C_{n,m}'[k]$ between the mth transmit antenna patch and the nth receive antenna patch on the kth subcarrier can be estimated. Multiple OFDM subcarriers may occur at different frequencies within the overall signal bandwidth. This provides an opportunity to sample the variation of calibration coefficients with respect to frequency across a relatively wide frequency band. Based on this observation, computation of the calibration coefficient on each subcarrier can be performed independently, for example using the method described in Aumann and outlined above. It is assumed in this approach that a phase shifter has only one nominal value within a given signal bandwidth. From the plurality of calibration coefficients across all subcarriers and across all antenna elements, a desirable set of calibration coefficients can be computed for the antenna elements. In one embodiment, for each given antenna element, the average value of the calibration coefficients across all subcarrier within the signal bandwidth is used as the calibration coefficient.

In various embodiments, the antenna elements of the array are equally spaced with respect to their nearest neighbour antenna elements. The antenna elements may be patch antennas, for example.

In various embodiments, calibration is performed periodically after deployment. The periodic calibration may be performed in order to compensate for gain and phase mismatches arising for example due to temperature variation.

In various embodiments, different calibration operations are used to transmit different broadcast information. That is, it is not necessary to transmit the same information at each calibration operation.

In some embodiments, a calibration feedback port is used to monitor the signal being transmitted. In some embodiments, the calibration feedback port may be operatively coupled to a selected antenna element of the antenna array.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for operating an antenna array, comprising:
defining a plurality of different antenna element combinations each including a set of one or more transmitting antenna elements of the antenna array and a set of one or more receiving antenna elements of the antenna array, the receiving antenna elements being different than the transmitting antenna elements;
for each of the plurality of different antenna element combinations:
operating the set of transmitting antenna elements to transmit in a point-to-multipoint broadcast communication, a signal, wherein information communicated by the signal is different for each of the plurality of different antenna element combinations, the set of transmitting antenna elements selected and operated to produce a wide beam radiation pattern for the signal;
monitoring transmission of said signal by the set of transmitting antenna elements using the set of receiving antenna elements operating in a receive mode to obtain an indication of said signal; and
performing one of a sequence of antenna array calibration operations based on the indication of said signal,
the method further comprising, at another time, transmitting or receiving another signal via the antenna array used in a beamforming mode,
wherein at least two of the plurality of different antenna element combinations includes a common set of transmitting antenna elements and different sets of receiving antenna elements, or wherein at least two of the plurality of different antenna element combinations includes a common set of receiving antenna elements and different sets of transmitting antenna elements.

2. The method of claim 1, further comprising, during transmission of said signal, inhibiting antenna elements of the antenna array other than the set of transmitting antenna elements from operating in a transmit mode.

3. The method of claim 1, wherein the set of transmitting antenna elements consists of a single antenna element.

4. The method of claim 1, wherein the set of transmitting antenna elements consists of a sub-array of multiple antenna elements.

5. The method of claim 1, wherein the sequence of antenna array calibration operation forms part of a larger operation, the larger operation comprising determining calibration coefficients indicative of phase adjustments for correcting phase errors, gain adjustments for correcting gain errors, or both, wherein the phase errors and gain errors represent deviations from desired operating characteristics of portions of the antenna array.

6. The method of claim 5, further comprising adjusting one or more phase shifters of the antenna array based on the calibration coefficients.

7. The method of claim 1, wherein antenna array calibration operations corresponding to the at least two of the plurality of different antenna element combinations form part of a larger operation, the larger operation comprising determining calibration coefficients indicative of phase adjustments for correcting phase errors, gain adjustments for correcting gain errors, or both, wherein the phase errors and gain errors represent deviations from desired operating characteristics of a portion of the antenna array corresponding to some of the different sets of receiving antenna elements.

8. The method of claim 1, wherein antenna array calibration operations corresponding to the at least two of the plurality of different antenna element combinations form part of a larger operation, the larger operation comprising determining calibration coefficients indicative of phase adjustments for correcting phase errors, gain adjustments for correcting gain errors, or both, wherein the phase errors and gain errors represent deviations from desired operating characteristics of a portion of the antenna array corresponding to some of the different sets of transmitting antenna elements.

9. The method of claim 1, wherein transmitting the signal comprises broadcasting the signal for reception by multiple receivers, by a receiver having an imprecisely known location, or a combination thereof.

10. The method of claim 1, wherein the antenna array is used in a communication application comprising repeatedly alternating between a broadcast mode and the beamforming mode, and wherein transmitting said signal occurs during the broadcast mode.

11. The method of claim 1, wherein the beamforming mode is adjusted based on output of the sequence of antenna array calibration operations.

12. The method of claim 1, wherein the wide beam radiation patterns produced by the set of transmitting antenna elements of each of the plurality of different antenna element combinations causes the signal to be broadcast over a common region.

13. The method of claim 1, wherein each antenna element of the antenna array is included as one of the set of transmitting antenna elements in at least one of the plurality of different antenna element combinations.

14. An apparatus for use with an antenna array, the apparatus comprising:
- a controller configured to:
  - define a plurality of different antenna element combinations each including a set of one or more transmitting antenna elements of the antenna array and a set of one or more receiving antenna elements of the antenna array, the set of receiving antenna elements being different than the set of transmitting antenna elements; and
  - for each of the plurality of different antenna element combinations: operate the set of transmitting antenna elements to transmit in a point-to-multipoint broadcast communication, a signal, wherein information communicated by the signal is different for each of the plurality of different antenna element combinations, the set of transmitting antenna elements selected and operated to produce a wide beam radiation pattern for the signal;
- a local signal monitor configured, for each of the plurality of different antenna element combinations, to monitor transmission of said one of the plurality of signals by the set of transmitting antenna elements using the set of receiving antenna elements operating in the receive mode to obtain an indication of said signal; and
- a calibrator configured, for each of the plurality of different antenna element combinations, to perform a corresponding one of a sequence of antenna array calibration operations based on the indication of said signal,
- the apparatus further configured, at another time, to transmit or receive another signal via the antenna array in a beamforming mode,
- wherein at least two of the plurality of different antenna element combinations includes a common set of transmitting antenna elements and different sets of receiving antenna elements, or wherein at least two of the plurality of different antenna element combinations includes a common set of receiving antenna elements and different sets of transmitting antenna elements.

15. The apparatus of claim 14, wherein the controller is configured to inhibit transmissions by antenna elements of the antenna array other than the set of transmitting antenna elements during transmission of said signal.

16. The apparatus of claim 14, wherein the antenna array comprises a power distribution network having controllable elements for providing the signal to a selectable one or more of the antenna elements, and wherein operating the set of transmitting antenna elements comprises operating the controllable elements to provide said signal to the set of transmitting antenna elements.

17. The apparatus of claim 14, wherein the set of transmitting antenna elements consists of a single antenna element or a sub-array of antenna elements.

18. The apparatus of claim 14, wherein the calibrator is configured to perform a larger operation, the larger operation comprising determining calibration coefficients indicative of phase adjustments for correcting phase errors, gain adjustments for correcting gain errors, or both, wherein the phase errors and gain errors represent deviations from desired operating characteristics of portions of the antenna array, wherein the calibrator is further configured to cause adjustment of one or more phase shifters of the antenna array based on the calibration coefficients.

19. The apparatus of claim 14, wherein antenna array calibration operations corresponding to the at least two of the plurality of different antenna element combinations form part of a larger operation, the larger operation comprising determining calibration coefficients indicative of phase adjustments for correcting phase errors, gain adjustments for correcting gain errors, or both, wherein the phase errors and gain errors represent deviations from desired operating characteristics of a portion of the antenna array corresponding to some of the different sets of receiving antenna elements.

20. The apparatus of claim 14, wherein at least two different ones of the plurality of different antenna element combinations include different sets of receiving antenna elements, and wherein performing the sequence of calibration operations comprises determining calibration coefficients for each of the different sets of receiving antenna elements.

21. The apparatus of claim 14, wherein transmitting said signal comprises broadcasting said signal for reception by multiple receivers, by a receiver having an imprecisely known location, or a combination thereof.

22. The method of claim 14, wherein each antenna element of the antenna array is included as one of the set of transmitting antenna elements in at least one of the plurality of different antenna element combinations.

* * * * *